United States Patent [19]

Grose et al.

[11] 4,211,760
[45] Jul. 8, 1980

[54] CRYSTALLINE ZEOLITE UPSILON AND PROCESS FOR PREPARING SAME

[75] Inventors: Robert W. Grose, Mahopac; Edith M. Flanigen, White Plains, both of N.Y.

[73] Assignee: Union Carbide Corporation, New York, N.Y.

[21] Appl. No.: 18,074

[22] Filed: Mar. 6, 1979

Related U.S. Application Data

[63] Continuation of Ser. No. 432,137, Jan. 10, 1974, abandoned.

[51] Int. Cl.² ............................................. C01B 33/28
[52] U.S. Cl. ..................................... 423/328; 423/329
[58] Field of Search ...................... 423/328, 329, 330; 252/455 Z

[56] References Cited

U.S. PATENT DOCUMENTS

| | | | |
|---|---|---|---|
| 3,010,789 | 11/1961 | Milton | 423/328 |
| 3,030,181 | 4/1962 | Milton | 423/328 |
| 3,056,654 | 10/1962 | Barrer et al. | 423/328 |
| 3,247,195 | 4/1966 | Kerr | 423/328 X |
| 3,248,170 | 4/1966 | Kuetinskas | 423/328 |

OTHER PUBLICATIONS

Barrer et al., "J. Chem. Soc.", 1959, pp. 195–208.

*Primary Examiner*—Edward J. Meros
*Attorney, Agent, or Firm*—Richard G. Miller

[57] ABSTRACT

A novel zeolitic molecular sieve composition denominated Upsilon is synthesized from aqueous gels in the $Na_2O$—$Al_2O_3$—$SiO_2$ system. The molecular sieve has a pore diameter of about 3.5 Angstroms, a characteristic x-ray diffraction pattern and a composition expressed in moles of oxides as:

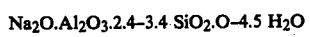

$Na_2O.Al_2O_3.2.4-3.4\ SiO_2.0-4.5\ H_2O$

4 Claims, No Drawings

CRYSTALLINE ZEOLITE UPSILON AND PROCESS FOR PREPARING SAME

This is a continuation of application Ser. No. 432,137 filed Jan. 10, 1974, now abandoned.

The present invention relates in general to a novel synthetic crystalline aluminosilicate of the molecular sieve type and to the hydrothermal method for its preparation. The composition is hereinafter denominated zeolite Upsilon.

As is the case with the other and prior known crystalline zeolites, zeolite Upsilon structurally consists basically of an open three-dimensional framework of $SiO_4$ and $AlO_4$ tetrahedra which are cross-linked by the sharing of oxygen atoms so that the ratio of oxygen atoms to the total of the framework aluminum and silicon atoms is two, i.e. $O/(Si+Al)=2$. The negative electrovalence of the $AlO_4-$ tetrahedra is balanced by the inclusion of cations within the crystal.

As synthesized, the cations in zeolite Upsilon are sodium cations.

The composition of crystalline zeolite Upsilon can stoichiometrically be expressed in terms of mole ratios of oxides as follows:

$$0.9\pm0.1 M_{2/n}O : Al_2O_3 : 2.4-3.4 SiO_2 : 0-4.5 H_2O;$$

wherein "M" is at least one or a mixture of two or more of hydrogen, ammonium or metal cations having a valence of "n."

In conjunction with its empirical chemical composition, zeolite Upsilon can be identified and distinguished from other zeolite species by its x-ray powder diffraction pattern. The x-ray data for a typical sample of zeolite Upsilon, prepared in accordance with Example 1 set forth hereinafter, is shown in Table A below.

TABLE A

| Bragg Angle, $2\phi$-Observed | Interplanar Spacing, d (Å) Observed | Relative Intensity, 100 I/Io | Relative Intensity |
|---|---|---|---|
| 6.59 | 13.412 | 17 | M |
| 9.34 | 9.468 | 100 | VS |
| 10.32 | 8.571 | 20 | M |
| 13.24 | 6.687 | 12 | W |
| 13.92 | 6.362 | 6 | VW |
| 14.75 | 6.006 | 7 | VW |
| 16.17 | 5.481 | 27 | S |
| 16.85 | 5.262 | 5 | VW |
| 17.65 | 5.025 | 4 | VW |
| 18.80 | 4.720 | 7 | VW |
| 19.30 | 4.599 | 7 | VW |
| 19.70 | 4.506 | 6 | VW |
| 21.00 | 4.230 | 32 | S |
| 21.56 | 4.122 | 8 | W |
| 21.98 | 4.044 | 10 | W |
| 22.99 | 3.868 | 25 | S |
| 23.34 | 3.811 | 12 | W |
| 24.13 | 3.688 | 10 | W |
| 25.20 | 3.534 | 17 | M |
| 25.76 | 3.458 | 10 | W |
| 26.75 | 3.332 | 6 | VW |
| 27.08 | 3.293 | 17 | M |
| 27.53 | 3.240 | 12 | W |
| 28.73 | 3.107 | 5 | VW |
| 29.08 | 3.071 | 17 | M |
| 29.86 | 2.992 | 25 | S |
| 30.16 | 2.963 | 15 | M |
| 30.53 | 2.928 | 6 | VW |
| 31.38 | 2.851 | 29 | S |
| 31.65 | 2.827 | 18 | M |
| 33.18 | 2.700 | 12 | W |
| 33.30 | 2.690 | 12 | W |

TABLE A-continued

| Bragg Angle, $2\phi$-Observed | Interplanar Spacing, d (Å) Observed | Relative Intensity, 100 I/Io | Relative Intensity |
|---|---|---|---|
| 34.40 | 2.607 | 7 | VW |

W = weak
S = strong
VS = very strong
VW = very weak
M = medium

Standard techniques were employed to obtain the foregoing data. The radiation was the K-alpha doublet of copper, and a Geiger-counter spectrometer with a strip-chart pen recorder was used. The peak heights, I and the positions as a function of 2 times theta ($\phi$), where theta is the Bragg angle, were read from the spectrometer chart. From these the relative intensities, 100 I/I$_o$, where I$_o$ is the intensity of the strongest line or peak, and d(obs.), the interplanar spacing in Angstrom units corresponding to the recorded lines were calculated. The particular x-ray technique and/or apparatus employed, the humidity, the temperature, the orientation of the powder crystals and other variables, all of which are well known and understood by those skilled in the art of x-ray crystallography or diffraction, can cause some variation in the intensities and positions of the x-ray lines.

It is not, however, necessary to use all of the lines of the pattern of Table A to characterize zeolite Upsilon as a unique zeolite species and to distinguish it from all other crystalline zeolites. it is sufficient for such purposes that the characterizing x-ray diffraction pattern of zeolite Upsilon in the sodium cation form have at least those d-spacings given in Table B below.

TABLE B

| $d_{obs}$, Å | Relative Intensity |
|---|---|
| 13.4 ± 0.2 | M |
| 9.5 ± 0.2 | VS |
| 8.5 ± 0.15 | M |
| 5.47 ± 0.1 | S |
| 4.23 ± 0.08 | S |
| 3.87 ± 0.07 | S |
| 3.53 ± 0.06 | M |
| 3.30 ± 0.05 | M |
| 3.07 ± 0.05 | M |
| 2.98 ± 0.05 | S |
| 2.86 ± 0.05 | S |
| 2.83 ± 0.05 | M |

The various ion-exchanged forms of the zeolite exhibit the same essential x-ray pattern as in Table B. Ion-exchange is readily accomplished using the well-known and conventional techniques. Aqueous solutions of acids such as acetic and hydrochloric are suitable to substitute hydrogen cations into the crystal structure. Solutions of the common water-soluble salts, such as the chlorides and nitrates, of ammonia and the various metals can be used too as ion-exchange media to introduce ammonium and metal cations into the crystal structure. Ion-exchangeable metal cations include those of the alkali and alkaline earth metals and transition metals, i.e. those having atomic numbers of from 21 to 28, from 39 to 46 and from 72 to 78.

Zeolite Upsilon can be prepared hydrothermally by crystallization from a gel whose composition expressed in terms of mole-ratios of oxides falls within the following ranges:
$Na_2O/SiO_2$: 0.80 to 1.4

SiO$_2$/Al$_2$O$_3$: 3.0 to 7
H$_2$O/Na$_2$O: 32 to 50, preferably about 43.

In forming the aqueous sodium aluminosilicate reaction mixture the conventional reactants used in zeolite synthesis are suitably employed. Alumina can be obtained from activated alumina, alpha alumina, gamma alumina, alumina trihydrate, aluminum hydroxide or sodium aluminate. Sodium hydroxide can supply a portion or all of the sodium ions. Sodium silicates or solid reactive amorphous silicas such as silica residues obtained by acid extraction treatment can serve as the major source of silica for the reaction mixture. In addition to the aforesaid reactants, it is found that the presence of chromium or iron oxides in the reaction mixture is essential to obtaining the desired Upsilon zeolite as the major zeolite product. Amounts of iron, calculated as Fe$_2$O$_3$, from about 0.5 to 2.5 weight percent based on the weight of silica are found to be quite effective in directing the course of crystallization. Such concentrations of iron are often found in natural zeolite deposits, such as chabazite-containing ore, and it is found that silica residue derived from such natural deposits is an advantageous source of solid amorphous silica for the reaction mixture. In the case of chromium-containing reactant mixtures having molar oxide compositions falling within the aforesaid ratio ranges, it has been found quite satisfactory to employ about 0.5 to 1.0 mole of Cr$_2$O$_3$ (in the form of Na$_2$CrO$_4$) per mole of Al$_2$O$_3$, conveniently in admixture with the required amount of sodium hydroxide, when sodium silicate (less than 0.1 wt.-% Fe$_2$O$_3$ content) is the silica source.

For best results, the crystallization procedure is carried out at a temperature of approximately 100° C., the pressure being atmospheric, or at least that corresponding to the vapor pressure of water in equilibrium with the mixture of reactants. Any suitable heating apparatus, e.g., an oven, sand bath, oil bath, or jacketed autoclave, may be used. Heating is continued until the desired crystalline zeolite Upsilon product is formed. The zeolite crystals are then filtered off and washed to separate them from the mother liquor. The zeolite crystals are washed, preferably with distilled water, until the effluent wash water, in equilibrium with the product, has a pH of between about 9 to 12.

The method for preparing zeolite Upsilon is illustrated by the following examples.

EXAMPLE 1

A reaction mixture was prepared by dissolving 6.0 grams of a silica (85% SiO$_2$, hydrated basis) residue (prepared by acid leaching natural chabazite-containing ore) and 5.0 grams sodium hydroxide in water. This residue contained 0.7% Fe$_2$O$_3$ based on the weight of silica. To this solution was added 5.5 grams of sodium aluminate dissolved in water. The total quantity of water present in this mixture was 65.0 grams. The overall composition of the resultant gel, in terms of moles of oxide, was as follows:

3.5Na$_2$O.Al$_2$O$_3$.3.4SiO$_2$.150H$_2$O.

This reaction mixture was placed in a "Teflon"-lined glass jar and digested at 100° C. for 26 hours. At the end of this period the solid product was filtered out, washed with water and dried at 110° C. Samples of this product were analyzed by wet chemical and X-ray powder diffraction methods. The results of wet chemical analysis were as follows:

Na$_2$O—15.2 wt.-%
Al$_2$O$_3$—24.9 wt.-%
SiO$_2$—39.7 wt.-%
LOI—19.3 wt.-%

This corresponds to an oxide composition of:

1.0Na$_2$O.Al$_2$O$_3$.2.71SiO$_2$.4.39H$_2$O.

This product exhibited the X-ray powder diffraction pattern of Table A supra. The zeolite Upsilon was indexed in the cubic system with a$_o$=18.98 Angstroms.

EXAMPLE 2

Using the same procedure as given in Example 1 above, an aqueous reactant mixture based on sodium aluminate, sodium hydroxide and a silica residue was prepared. The silica residue (82% SiO$_2$, hydrated basis) was obtained by acid-leaching a natural chabazite-containing ore, and contained 2.5% Fe$_2$O$_3$ based on the weight of silica. The overall composition of this reactant mixture, in terms of moles of oxides, was as follows:

3.2Na$_2$O.Al$_2$O$_3$.4.0SiO$_2$.138H$_2$O.

This reaction mixture was placed in a "Teflon"-lined glass jar and digested for seven hours at 100° C. The zeolite Upsilon product was identified by its characteristic X-ray powder diffraction pattern and by wet chemical analysis. The oxide composition of the zeolite Upsilon product was 1.0Na$_2$O.Al$_2$O$_3$.3.00SiO$_2$.4.55H$_2$O.

EXAMPLE 3

An aqueous reaction mixture based on aluminum metal, sodium hydroxide, sodium chromate and a high-purity sodium silicate was prepared, such that the overall composition, in terms of moles of oxides, was as follows:

6.5Na$_2$O.Al$_2$O$_3$.0.5Cr$_2$O$_3$.5.0SiO$_2$.280H$_2$O.

After 22 hours of reaction at 100° C., the zeolite Upsilon product was identified by its characteristic X-ray powder diffraction pattern and by wet chemical analysis. The molar oxide composition of the chromium-containing (10.1 wt.%) zeolite Upsilon product was 1.09Na$_2$O.Al$_2$O$_3$.0.36Cr$_2$O$_3$.3.38SiO$_2$.6.16H$_2$O.

EXAMPLE 4

A sample of the zeolite Upsilon product of Example 2 was contacted with a 10% aqueous solution of LaCl$_3$ for three hours at room temperature. Analysis of the recovered material indicated that 0.07 moles of La$^{+3}$ per mole of Al$_2$O$_3$ were exchanged into the zeolite; La$^{+3}$ exchange of another zeolite Upsilon product (SiO$_2$/Al$_2$O$_3$=2.63) at 80° C. resulted in incorporation of 0.14 moles of La$^{+3}$ per mole of Al$_2$O$_3$. Similarly, by aqueous exchange with Mg(NO$_3$)$_2$ and KCl (10% solutions) at room temperature for 3 hours, 0.36 moles of Mg$^{+2}$ and 0.90 moles of K$^+$, per mole of Al$_2$O$_3$, respectively, were incorporated into two other samples of zeolite Upsilon. X-ray diffraction examination of the several exchanged zeolite Upsilon products indicated no significant differences in X-ray patterns compared with that of the as-synthesized (sodium cation-form) zeolite Upsilon materials.

The following adsorption data were obtained on activated (350° C.) samples of the zeolite Upsilon product of Example 1, above:

| Adsorbate | Adsorption Conditions | | Wt. % Adsorbed |
|---|---|---|---|
| | T, °C. | Pressure, torr. | |
| $N_2$ | −196 | 750 | 2.5 |
| $O_2$ | −183 | 750 | 17.0 |
| $CO_2$ | 25 | 750 | 16.8 |
| $H_2O$ | 25 | 18 | 23.3 |

The following adsorption data were obtained on activated (350° C.) samples of the ion-exchanged products shown in Example 4, above:

| Adsorbate | Adsorption Conditions | |
|---|---|---|
| | T, °C. | Press., torr. |
| $CO_2$ | 25 | 750 |
| $O_2$ | −183 | 750 |
| $N_2$ | −196 | 750 |

| Wt. % Adsorbed | | |
|---|---|---|
| $La^{+3}$-exch. | $Mg^{+2}$-exch. | $K^+$-exch. |
| 14.9 | 14.4 | 8.7 |
| 16.2 | 4.4 | 5.1 |
| 4.7 | 2.9 | 5.1 |

Zeolite Upsilon has a pore diameter of about 3.5 Å and, as shown above, has a substantial capacity for adsorbing water. It, therefore, is useful as a desiccant, particularly in drying hydrocarbon gas streams containing water vapor and in drying air streams which are subsequently to be fractionated in the liquid state. Zeolite Upsilon also adsorbs carbon dioxide readily and is, therefore, useful for removing this constituent from air streams supplied to air separation plants.

What is claimed is:

1. A synthetic crystalline zeolitic molecular sieve having a composition expressed in terms of mole ratios of oxides as follows:

$$0.9 \pm 0.1 M_{2/n}O : Al_2O_3 : 2.4-3.4 SiO_2 : 0-4.5 H_2O,$$

wherein "M" is at least one or a mixture of two or more of hydrogen, ammonium or metal cations having a valence of "n," said zeolitic molecular sieve in its sodium cation form having an X-ray powder diffraction pattern containing at least those d-spacings set forth in Table B.

2. Composition according to claim 1 wherein "M" represents the sodium cation.

3. A process for preparing the synthetic crystalline zeolite described in claim 2, which comprises preparing an aqueous sodium aluminosilicate reactant mixture having a composition expressed in terms of mole-ratios of oxides falling within the following ranges:

$Na_2O/SiO_2$—0.80 to 1.4
  $SiO_2/Al_2O_3$—3.0 to 7
  $H_2O/Na_2O$—32 to 50, wherein the major source of silica in said mixture is a solid reactive amorphous silica, said mixture also containing from 0.5 to 2.5 weight percent $Fe_2O_3$, based on the weight silica therein, maintaining said mixture at temperature of about 100° C. until crystals are formed, and separating the crystals from the mother liquor.

4. A process for preparing the synthetic crystalline zeolite described in claim 2, which comprises preparing an aqueous sodium aluminosilicate reactant mixture having a composition expressed in terms of mole-ratios of oxides falling within the following ranges:

$Na_2O/SiO_2$—0.80 to 1.4
  $SiO_2/Al_2O_3$—3.0 to 7
  $H_2O/Na_2O$—32 to 50, wherein the major source of silica in said mixture is sodium silicate, said mixture also containing from about 0.5 to 1.0 mole of $Cr_2O_3$ per mole of $Al_2O_3$ therein, maintaining said mixture at temperature of about 100° C. until crystals are formed, and separating the crystals from the mother liquor.

* * * * *